Oct. 13, 1959 G. H. BOTKO 2,908,016
CUSHION ISCHIAL SEAT FOR AN ARTIFICIAL ABOVE-KNEE
LEG SOCKET AND BELOW-KNEE WEIGHT BEARING LACER
Filed July 30, 1956 2 Sheets-Sheet 2

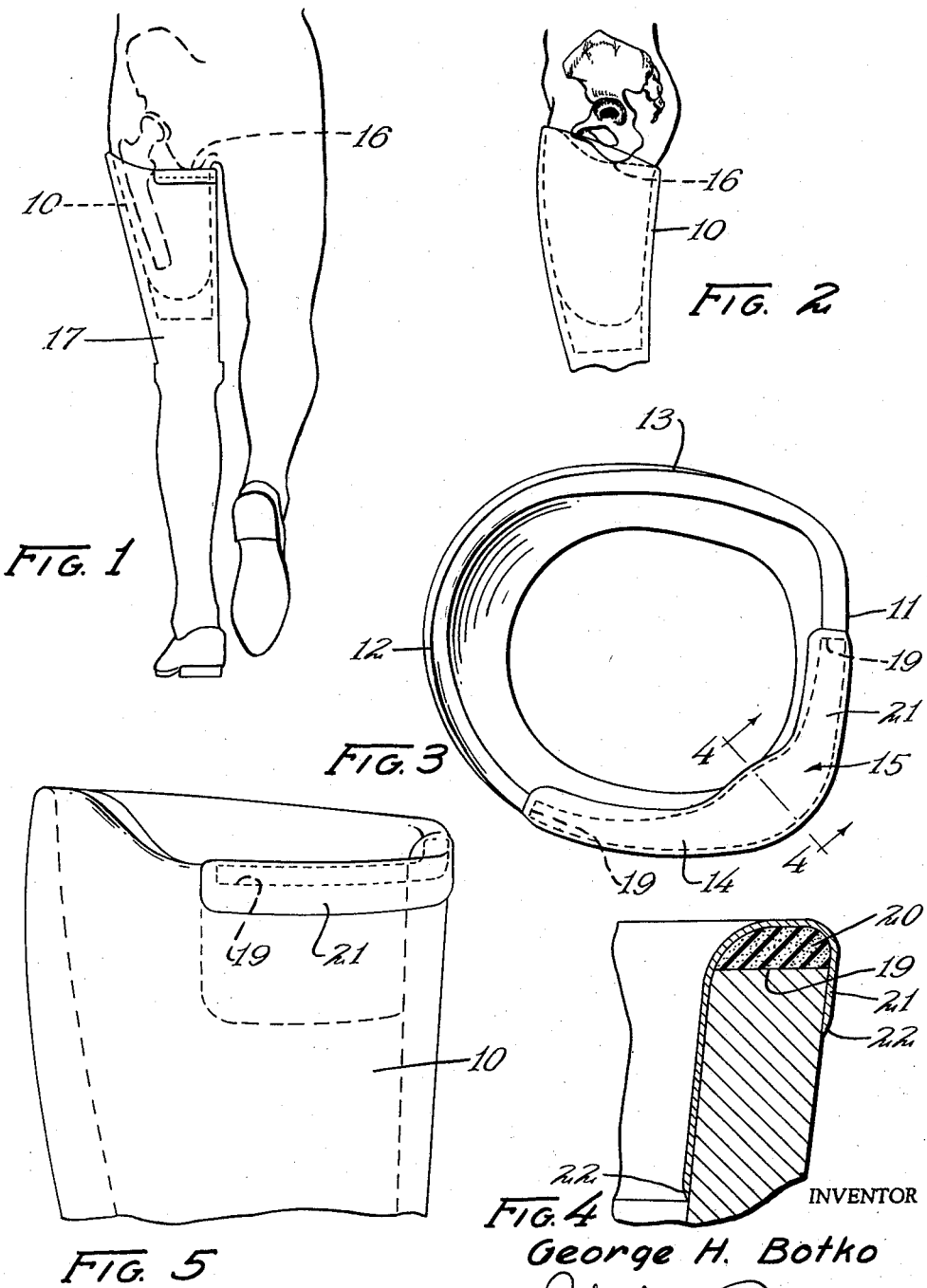

INVENTOR
George H. Botko
BY *Robert M. Dunning*
ATTORNEY

United States Patent Office 2,908,016
Patented Oct. 13, 1959

2,908,016

CUSHION ISCHIAL SEAT FOR AN ARTIFICIAL ABOVE-KNEE LEG SOCKET AND BELOW-KNEE WEIGHT BEARING LACER

George H. Botko, Minneapolis, Minn.

Application July 30, 1956, Serial No. 600,744

3 Claims. (Cl. 3—17)

This invention relates to an improvement to a cushion ischial seat for an artificial above-knee leg socket and below-knee weight bearing lacer.

Amputees wearing artificial legs suffer considerable discomfort due to contact of the ischial tuberosity with the ischial seat formed near the medial and posterior edges of the limb socket. Much time and work has been spent in properly designing this portion of the leg socket as considerable discomfort is often caused if the ischial seat is improperly formed or improperly located.

As the anatomy of each amputee differs to some extent considerable difficulty is often experienced in properly forming the limb socket. When the ischial tuberosity rides on the edge of the seat a jabbing sensation or a marked increase in pressure is felt near the end of the stance phase while the amputee is walking. In spite of efforts to properly locate the ischial seat it is this portion of the socket which usually causes more discomfort than any other portion.

Attempts have been made to produce artificial leg sockets which are comfortable to wear by equipping the upper and inner surface of the socket with a resilient cushion or pad. Unfortunately, such an arrangement does not usually accomplish the desired result for several reasons one of which lies in the fact that the resilience of the pad permits the limb to move to some extent in any direction in the socket and the proper control of the leg is not provided. The interior brim of the socket is designed to maintain the ischium in place upon the ischial seat, and by providing a cushion interiorly of the anterior wall, the desired result is not accomplished.

A feature of the present invention resides in the provision of an artificial leg of usual shape and design but having a section of the upper brim of the leg socket notched or cut away along a part of the medial wall and also along a part of the posterior brim of the socket. In this notch is provided a layer of resilient material such as neoprene which is resistant to excessive compression but has enough resiliency to provide a soft cushion for the ischial tuberosity thus alleviating discomfort. This layer is shaped similar to the normal shape of the brim of the socket so that the actual shape of the socket remains unchanged. This resilient insert as well as the adjoining portions of the leg socket are then covered with a soft pliant leather which is skived or sanded along its edges to blend into the surface of the socket.

A feature of the present invention resides in the provision of an artificial leg socket which includes a resilient or compressible insert extending along the brim of the socket at the location of the ischial seat to form a support for the ischium tuberosity. The arrangement is such that the leg socket properly fits the limb and at the same time the ischium pressure which causes extreme discomfort to some amputees is alleviated. Another feature of the cushion ischial seat is that the break-in period of the use of the artificial limb is thus greatly decreased.

While the advantages have been described as applying particularly to an above knee prosthesis, the same advantages apply to a below knee prosthesis having a weight bearing lacer. My cushion ischial seat has also been successfully used on such a limb and accordingly, I desire to have it understood that the term "socket" as used may apply equally well to a weight bearing lacer for a below-knee prosthesis.

These and other objects and novel features of the present invention will be more clearly and fully set forth in the following specification and claims.

In the drawings forming a part of the specification:

Figure 1 is a rear elevational view of a portion of an artificial leg showing diagrammatically the position of the ischial tuberosity relative to the limb socket.

Figure 2 is a side elevational view showing diagrammatically the relationship of the leg socket to the ischial tuberosity.

Figure 3 is a top plan view of the leg socket.

Figure 4 is an elevational view of the leg socket.

Figure 5 is a cross sectional view through the ischial seat portion of the limb socket.

Figure 6:
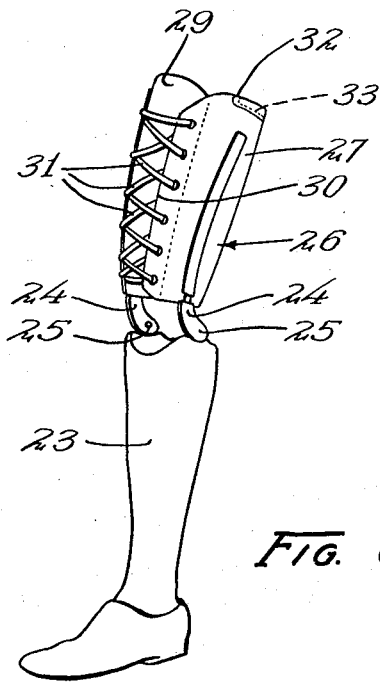
Figure 6 is a perspective view of a below knee prosthesis having a weight bearing lacer attached thereto.

The general outline of the limb socket is best illustrated in Figure 3 of the drawings. The socket is indicated in general by the numeral 10, the socket illustrated being for the left leg. The socket is roughly rectangular in form including a medial side 11, a lateral side 12, an anterior side 13, and a posterior side 14. The ischial seat is indicated in general by the numeral 15 and is near the juncture of the medial and posterior sides of the socket or near the posteromedian apex. The ischium usually rests upon this seat at an area which is usually somewhat laterally spaced from the medial side and on the posterior rim of the socket.

Figure 1 of the drawings indicates the location of the ischial tuberosity 16 with respect to the upper surface of the artificial leg socket 10. The limb in which the socket is formed is indicated in general by the numeral 17 and is only illustrated in outline in Figures 1 and 2 of the drawings, the details of construction of the leg being omitted as they form no part of the present invention.

As is indicated in Figures 3, 4 and 5 of the drawings, the upper surface of the leg socket rim is notched at 19 to provide a shallow notch preferably having its undersurface on a single plane. This shallow notch extends along the medial wall to a point spaced from the anterior wall, and along the posterior wall to a point near the lateral wall. Thus this socket is formed in the portion of the socket rim which usually forms the ischial seat 15.

A layer of resilient material such as rubberized cork, neoprene or the like is placed in the notch 19. This layer of resilient material forms a pad 20 overlying the ischial seat. The neoprene or similar material is relatively resistant to compression as compared with softer foam rubber so that a small area of this pad, when subjected to pressure, does not compress more than a small fraction of its thickness. Sponge rubber which is resistant to excessive compression could be used. As a result, the pad provides support for the ischium weight or pressure but at the same time cushions the pressure to some extent.

The pad is shaped to conform with the normal shape of the leg socket. The iner edges of the pad are formed to conform with the inner surfaces of the portions of the socket adjoining the notch. In other words, the outline and sectional shape of the socket is not changed by the addition of the paid.

A covering of soft pliant leather or similar material overlies the pad 20 and completely encloses the same. The leather covering 21 is adhered to the surfaces of the socket 10 and these marginal edges are skived or sanded so as to blend into the surface of the socket and to prevent a ridge on the inner surface of the socket against which the stump of the leg may engage. The skived edges of the leather covering are indicated at 22.

By forming the leg socket in the manner illustrated, the amputee experiences much less discomfort due to pressure of the ischial tuberosity upon the ischial seat and the break-in period is materially reduced. The resilience of the pad also allows the ischial seat to conform to the shape of the individual tuberosity thus eliminating much discomfort to amputees. One of the main causes of discomfort has been that shapes and sizes of ischial tuberosities differ according to individuals and therefore an ischial seat with hard surface is a major cause of discomfort.

Figure 7:
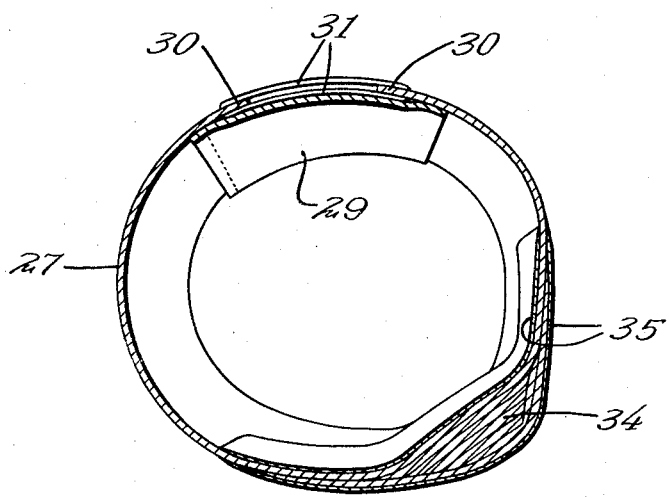
Figure 7 is a sectional plan view of the upper end of the lacer, showing the ischial pad therein.

In Figures 6 and 7 of the drawings I disclose a below knee prosthesis indicated in general at 23. Artificial knee joints 24 are hingedly connected at 25 to the upper end of the prosthesis 23 on opposite sides of the lacer 26. The pivots 25 are substantially aligned with the knee joint of the amputated leg so that the artificial knee joints may bend with the knee.

A weight bearing lacer 27 is attached to the artificial knee joints 24. This lacer consists of a sleeve of leather or the like which is split, with a tongue 29 on one side of the split over-lapping the other edge thereof. The lacer encircles the thigh of the amputee's leg. Lacing edges 30 are provided along the split sides of the lacer, and laces 31 permit these lacing edges to be drawn together over the tongue 29 to secure the lacer.

In this case, the upper margin 32 of the lacer is provided with an ischial seat against which the ischial tuberosity may bear. The seat is usually built up of plies of leather. As shown in Figure 7, the upper edge of the seat 33 is notched to accommodate a cushioning pad 20 previously described. A pliant leather covering 35 similar to the covering 21 encloses the pad 34.

In many cases of this type, the knee or lower leg muscles are not capable in themselves of sustaining the weight of the amputee. Thus the weight is supported by the weight bearing lacer, which in effect forms the "socket" into which the thigh extends.

In accordance with the patent statutes, I have described the principles of construction and operation of my cushion ischial seat for above-knee leg socket and below-knee weight bearing thigh lacer for prosthesis, and while I have endeavored to set forth the best embodiment thereof, I desire to have it understood that obvious changes may be made within the scope of the following claims without departing from the spirit of my invention.

I claim:

1. An above knee prosthesis including a leg body having a stump socket in its upper end, said socket having an encircling rim including medial, lateral, anterior and posterior sides, a portion of the medial and posterior sides of said rim being thickened to provide an ischial seat, and a cushioning pad of resilient material overlying adjoining portions of the medial and posterior sides of said rim forming said ischial seat.

2. The structure described in claim 1 and in which the pad terminates short of the anterior and lateral sides of said rim.

3. The structure of claim 1 and including a flexible covering member secured marginally to said rim and enclosing said pad.

References Cited in the file of this patent

UNITED STATES PATENTS

| | | |
|---|---|---|
| 295,675 | Collins | Mar. 25, 1884 |
| 772,753 | Staggs | Oct. 18, 1904 |

FOREIGN PATENTS

| | | |
|---|---|---|
| 181,922 | Austria | May 10, 1955 |